United States Patent [19]

Higuchi et al.

[11] Patent Number: 5,311,500
[45] Date of Patent: May 10, 1994

[54] MAGNETO-OPTICAL DISK

[75] Inventors: Manabu Higuchi; Takashi Yamada; Masaaki Nomura; Akira Nahara, all of Odawara, Japan

[73] Assignee: Fuji Photo Film Co., Ltd., Kanagawa, Japan

[21] Appl. No.: 47,003

[22] Filed: Apr. 14, 1993

Related U.S. Application Data

[63] Continuation of Ser. No. 963,017, Oct. 19, 1992, abandoned, which is a continuation of Ser. No. 298,958, Jan. 19, 1989, abandoned.

[30] Foreign Application Priority Data

Jan. 22, 1988 [JP] Japan ............................... 63-12118

[51] Int. Cl.$^5$ ................................ G11B 7/24
[52] U.S. Cl. ...................... 369/288; 428/695
[58] Field of Search ............ 369/13, 288; 360/59, 360/114, 135, 131; 365/122; 428/695, 694

[56] References Cited

U.S. PATENT DOCUMENTS

| | | | |
|---|---|---|---|
| 4,737,408 | 4/1988 | Kuwahara et al. | 428/336 |
| 4,807,220 | 2/1989 | Miyai et al. | 369/283 |
| 4,824,724 | 4/1989 | Ueda et al. | 428/695 |
| 4,826,739 | 5/1989 | Isoe et al. | 428/695 |
| 4,833,031 | 5/1989 | Kurokawa et al. | 428/695 |

FOREIGN PATENT DOCUMENTS

| | | |
|---|---|---|
| 61-03336 | 1/1986 | Japan . |
| 61-118466 | 6/1986 | Japan . |
| 62-20156 | 1/1987 | Japan . |
| 62-62332 | 3/1987 | Japan . |
| 62-150325 | 7/1987 | Japan . |

*Primary Examiner*—Hoa T. Nguyen
*Attorney, Agent, or Firm*—Sixbey, Friedman, Leedom & Ferguson

[57] ABSTRACT

A magneto-optical disk comprises a substrate and at least a magneto-optical recording layer provided on the substrate. A moisture barrier layer constituted of a fluorine resin is provided on the surface of the substrate on the side opposite to the substrate surface on which the magneto-optical recording layer is provided.

2 Claims, 1 Drawing Sheet

MAGNETO-OPTICAL DISK

This application is a continuation of Ser. No. 07/963,017, filed Oct. 19, 1992, now abandoned, which was a continuation of application Ser. No. 07/298,958, filed Jan. 19, 1989, now abandoned.

BACKGROUND OF THE INVENTION

1. Field of the Invention

This invention relates to a magneto-optical disk for large-capacity information storage or the like. This invention particularly relates to an improvement of the structure of a magneto-optical disk.

2. Description of the Prior Art

Among magneto-optical recording media, magneto-optical disks have attracted particular attention for enabling easy erasing and rerecording.

A magneto-optical disk is composed of a substrate, a magneto-optical recording layer for recording signals thereon and a protective layer constituted of a dielectric layer for protecting the magneto-optical recording layer, which layers are sequentially overlaid on the substrate. In general, signal recording and read-out are effected by irradiating recording light or reading light onto the magneto-optical recording layer through the substrate, which is constituted of a transparent plastic material.

The plastic material which constitutes the substrate absorbs ambient moisture and expands. Therefore, a stress imbalance arises in the plane of the substrate at the boundary between the substrate and the protective layer or the like having a small coefficient of moisture-absorption expansion. As a result, the magneto-optical recording layer or the protective layer cracks or separates from the substrate, and the quality of the performance of the recording medium deteriorates.

In order to eliminate the aforesaid problem, a novel magneto-optical disk has been disclosed in, for example, Japanese Unexamined Patent Publication Nos. 61(1986)-3336 and 62(1987)-20156. The disclosed magneto-optical disk is characterized by having a protective layer, which is constituted of an organic substance having high moisture barrier characteristics such as poly-para-xylylene or its derivatives or polyvinylidene chloride, on the outward side of the substrate, thereby preventing the substrate, from absorbing moisture.

However, to form a protective layer constituted of poly-para-xylylene or its derivative, a dimer of poly-para-xylylene is sublimated and decomposed into poly-para-xylylene monomers, and the monomers are then deposited onto the substrate. Therefore, from a practical point of view dense protective layers for blocking moisture cannot be mass-produced in an acceptable period of time because of the slow rate of deposition (approximately 1μ/hour).

On the other hand, polyvinylidene chloride is classified into a solvent-soluble type and an aqueous dispersion type. When a protective layer is formed by use of the solvent-soluble type of polyvinylidene chloride, a problem arises in that substrates constituted of polycarbonate or acrylic materials (for example, PMMA) are corroded by the solvent used for dissolution of the polyvinylidene chloride. When a protective layer is formed by use of the aqueous dispersion type of polyvinylidene chloride, a problem arises in that the protective layer, which is formed by coating, whitens unless the substrate and the coating composition for the formation of the protective layer are heated. Also, a protective layer formed by coating readily cracks, depending on the concentration of the coating composition.

Also, forming a protective layer of a silicone resin, which is an organic substance having high moisture barrier characteristics, has been considered. However, when silicone resin is employed, a thermal cure process (at 120° C. to 150° C.) is required for condensation with dehydration during formation of the siloxane bonds, and productivity decreases because of the thermal cure process.

Further, it has been considered to constitute a moisture barrier layer of an ultraviolet-curing resin or an electron radiation curing resin.

When using an ultraviolet-curing resin, equipment for irradiating ultraviolet rays is required, and an additional process is necessary for curing resin.

When using an electron radiation curing resin, equipment for irradiating the electron beam is required, an additional process is necessary for curing resin, and productivity decreases.

SUMMARY OF THE INVENTION

The primary object of the present invention is to provide a magneto-optical disk which is free from deterioration in quality caused by such problems as whitening of the protective layer, which protective layer protects the substrate from moisture, cracking on the inside of the protective layer, and corrosion of the substrate.

Another object of the present invention is to provide a magneto-optical disk which enables improvement of disk productivity.

The present invention provides a magneto-optical disk comprising a substrate and at least a magneto-optical recording layer provided on said substrate, wherein the improvement comprises the provision of a moisture barrier layer constituted of a fluorine resin, which moisture barrier layer is formed on the surface of said substrate on the side opposite to the substrate surface on which said magneto-optical recording layer is provided.

With the magneto-optical disk in accordance with the present invention, it is possible to eliminate the problems with conventional magneto-optical disks such as corrosion of the substrate, whitening of the moisture barrier layer, and cracking inside the magneto-optical recording layer, which deteriorate the quality of the magneto-optical disk. Also, the processing time required for the formation of the moisture barrier layer can be shortened markedly when compared with conventional techniques of moisture barrier layer formation, and therefore productivity in manufacturing the magneto-optical disks can be improved.

DESCRIPTION OF THE PREFERRED EMBODIMENTS

The present invention will hereinbelow be described in further detail with reference to the accompanying drawings.

Figure 1:
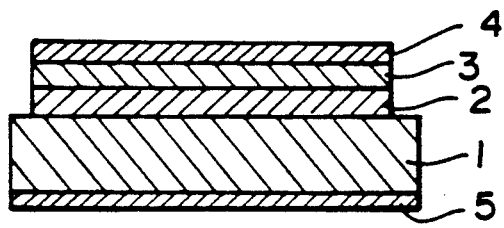
FIG. 1 is a schematic sectional view showing an embodiment of the magneto-optical disk in accordance with the present invention.

With reference to FIG. 1, a magneto-optical disk comprises a transparent annular substrate 1, a first dielectric layer 2, a magneto-optical recording layer 3, and a second dielectric layer 4, which are provided in this order on the substrate 1. A moisture barrier layer 5 is provided on a surface (the outer surface) of the substrate 1 on the side opposite to the surface on which the magneto-optical recording layer 3 is provided.

The substrate 1 is constituted of a transparent plastic material such as polycarbonate or an acrylic material (for example, PMMA) having a thickness of approximately 1.2 mm. The first dielectric layer 2 and the second dielectric layer 4 are each constituted of a dielectric such as SiO, $SiO_2$, $Si_3N_4$ or ZnS of protecting the magneto-optical recording layer 3 from oxidation and corrosion, and have a thickness of, for example, approximately 1,000Å. The magneto-optical recording layer 3 is constituted of an amorphous rare earth metaltransition metal alloy having a thickness of, for example, approximately 1,000Å. The first dielectric layer 2, the magneto-optical recording layer 3 and the second dielectric layer 4 are sequentially overlaid on the substrate 1 by sputtering, vacuum evaporation or the like.

Also, the moisture barrier layer 5, which is constituted of fluorine resin, is provided on the outer surface of the substrate 1. The plastic material which constitutes the substrate 1 readily absorbs ambient moisture, and expands with absorbing moisture. Therefore, the moisture barrier layer 5 is provided to prevent the substrate 1 from absorbing moisture. Specifically, when the substrate 1 expands with absorbing moisture, a stress imbalance arises between the substrate 1 and a plurality of the layers 2, 3 and 4 provided on the substrate 1. As a result, the layers 2, 3 and 4 are separated and are cracked, and are thus deteriorated. The moisture barrier layer 5 eliminates such problems.

The fluorine resin which constitutes the moisture barrier layer 5 should preferably be an alkyl fluoride-acrylic copolymer such as a perfluoroalkyl-acrylic copolymer. Also, a fluorine resin such as a fluoroolefin-vinyl ether copolymer, polyvinyl fluoride, or polyvinylidene fluoride may be used for this purpose. After the first dielectric layer 2, the magneto-optical recording layer 3 and the second dielectric layer 4 have been overlaid on the substrate 1, the moisture barrier layer 5 is provided on the outer surface of the substrate 1 in a thickness of approximately 2 μm by a spin coating process or a dipping process using a solution of the fluorine resin in a solvent such as Fluorocoat (#EC-300) supplied by Asahi Glass Co., Ltd.

The solvent for dissolving the fluorine resin may be selected from Fron R-113, meta-xylene hexafluoride (mXHF), a mixture of butyl acetate with mXHF, a mixture of Fron R-113 with mXHF, a mixture of Fron R-113 with toluene, a mixture of Fron R-112 with an alcohol, and the like.

Though poly-para-xylylene, polyvinylidene chloride and the like have been developed as organic resins having the effect of protecting the substrate 1 from moisture, they have inherent problems. On the other hand, the fluorine resin is an excellent material for constituting the moisture barrier layer and can solve the problems exhibited by poly-para-xylylene, polyvinylidene chloride and the like.

Specifically, the technique used for forming a moisture barrier layer (hereinafter, simply called "the technique") from the fluorine resin is better than the technique using poly-para-xylylene in that no vacuum system is required for a layer forming process and mass-production can be achieved with a high productivity by merit of the high speed of layer formation. Also, the technique using the fluorine resin is better than the technique using the solvent-soluble type of polyvinylidene chloride in that the former is free from the problem with regard to the corrosion of the surface of the substrate by a solvent such as tetrahydrofuran (THF) or toluene. Further, the technique using the fluorine resin is better than the technique using the aqueous dispersion type of polyvinylidene chloride in that there is no risk of whitening or cracking in layer, depending on the concentration of the coating composition, even though the substrate and the coating composition are heated uniformly. Moreover, the technique using the fluorine resin is better than the technique using a silicone resin in that neither a primer (adhesion strengthening agent) nor a thermal curing process is required and the manufacturing productivity is high. Furthermore, the technique using the fluorine resin is better than the technique using an ultraviolet-curing resin or an electron radiation curing resin in that no equipment for producing ultraviolet rays or electron radiation is required and the manufacturing productivity is high.

The refractive index $n1$ of the moisture barrier layer 5 provided in the manner described above is within the range of approximately 1.38 to approximately 1.39. On the other hand, the refractive index $n0$ of the substrate 1 (constituted of polycarbonate, PMMA or the like) is approximately 1.6. As $n1 < n0$, surface reflection of the incident light at the boundary between the moisture barrier layer 5 and the substrate 1 can be decreased, and the moisture barrier layer 5 can act in the same manner a reflection preventing film acts. Also, surface reflection of the incident light at the boundary between the moisture barrier layer 5 and the substrate 1 can be minimized when the thickness d of the moisture barrier layer 5 is adjusted to be $$\frac{\lambda}{2nl}\left(m + \frac{1}{2}\right)$$

where λ denotes the wavelength of the incident light, $n1$ denotes the refractive index of the moisture barrier layer 5, and m denotes an integer.

The thickness of the moisture barrier layer 5 is not limited to 2 μm, and may be larger than 2 μm so that the moisture-barring effect of the barrier is increased. However, when the thickness of the moisture barrier layer 5 is excessively large, the light transmission characteristics of the moisture barrier layer 5 decrease. Therefore, the thickness of the moisture barrier layer 5 should preferably be such that it substantially prevents moisture but does not decrease the amount of light incident upon the substrate 1.

Figure 2:
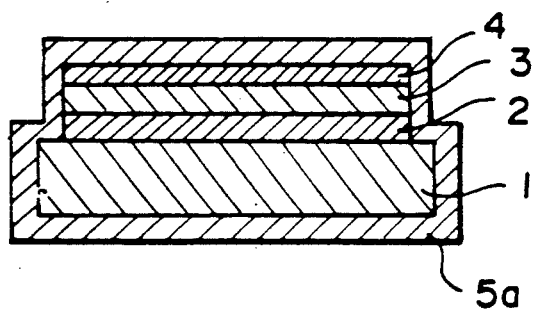
FIGS. 2, 3 and 4 are schematic sectional views showing further embodiments of the magneto-optical disk in accordance with the present invention.

FIG. 2 shows another embodiment of the magneto-optical disk in accordance with the present invention wherein a moisture barrier layer 5a of the same type as that described above is provided on the outer surface of the substrate 1, on all of the edge faces of the substrate 1, on all of the edge faces of a plurality of the layer 2, 3 and 4 provided on the substrate 1, and on the outer surface of the second dielectric layer 4. When a solution of the fluorine resin is to be coated on the edge face of the substrate 1 and the edge faces of a plurality of the layers 2, 3 and 4 provided on the substrate 1, a nonwoven fabric pad or the like may be dipped into the solution of the fluorine resin. The laminate comprising the substrate 1 and the layers 2, 3 and 4 may be rotated, and the nonwoven fabric pad may be pushed from a horizontal direction against the edge faces of the substrate 1 and the layers 2, 3 and 4. With this embodiment, it is possible to prevent moisture from entering the first dielectric layer 2, the magneto-optical recording layer 3 and the second dielectric layer 4, as well as the substrate 1. Particularly, the durability of the magneto-optical recording layer 3 can be improved.

Figure 3:
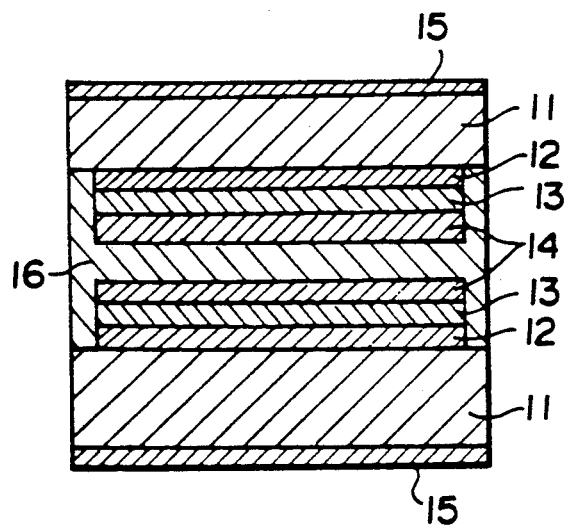

FIG. 3 shows a further embodiment of the magneto-optical disk in accordance with the present invention. This embodiment comprises two laminates each composed of a substrate 11, a first dielectric layer 12, a magneto-optical recording layer 13, and a second dielectric layer 14, which are overlaid in this order on the substrate 11. The two laminates are adhered together with an adhesive layer 16 intervening therebetween so that the second dielectric layers 14, 14 of the two laminates face inward. Moisture barrier layers 5, 5 are provided respectively on the outer surfaces of the substrates 11, 11.

Figure 4:
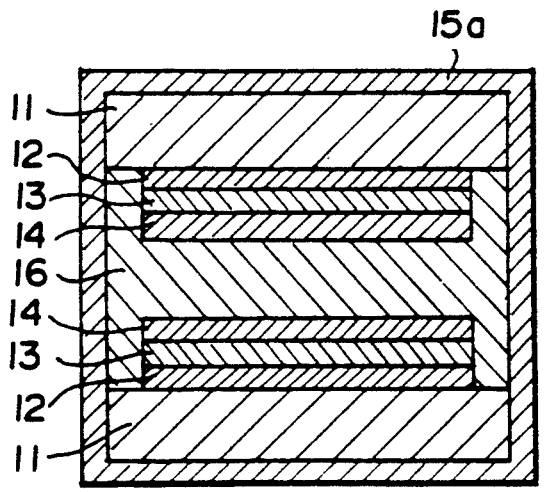

FIG. 4 shows a still further embodiment of the magneto-optical disk in accordance with the present invention. In this embodiment, a moisture barrier layer 15a is provided over the overall outer surfaces of the magneto-optical disk, including the outer surface of the substrate 11.

In the embodiments shown in FIGS. 3 and 4, the material, the method of formation, and the layer thicknesses of the moisture barrier layers 15, 15 and the moisture barrier layer 15a are the same as those of the moisture barrier layers 5 and 5a in the embodiments shown in FIGS. 1 and 2.

In the present invention, the configuration of the layers is not limited to those shown in FIGS. 1, 2, 3 and 4. For example, the first dielectric layer 2 or the first dielectric layer 12 may be omitted.

In the aforesaid embodiments, a spin coating process is employed for forming the moisture barrier layers 5, 5a, 15 and 15a. However, a roll coating process, a dipping process, a spraying process, or a sputtering process may be employed instead of the spin coating process. When the moisture barrier layer 5a is provided on the edge faces of the substrate 1 and on the edge faces of a plurality of the layers 2, 3 and 4 provided on the substrate 1 or when the moisture barrier layer 15a is provided on the edge faces of the substrates 11, 11, and on the edge faces of a plurality of the layers 12, 13 and 14 provided on each of the substrates 11, 11, no particular problem arises with regard to the surface shape, and therefore a painting process, a dipping process or the like may be employed.

In the embodiments shown in FIGS. 3 and 4, the moisture barrier layer 15 or the moisture barrier layer 15a is provided on the outer surfaces of the substrate 11, 11 after the two laminates are adhered together. However, the moisture barrier layer 15 or the moisture barrier layer 15a may first be provided on the outer surfaces of the substrate 11, 11, and then the two laminates may be adhered together.

The present invention will further be illustrated by the following nonlimitative examples.

EXAMPLE 1

A first dielectric layer constituted of silicon nitride, a magneto-optical recording layer constituted of TbFeCo, and a second dielectric layer constituted of silicon nitride were overlaid in this order by a sputtering process on a polycarbonate substrate having a refractive index of 1.6 and a thickness of approximately 1.2 mm. Thereafter, Fluorocoat (#EC-300 supplied by Asahi Glass Co., Ltd.) was applied by a spin coating process onto an outer surface of the substrate to provide a 2 $\mu$m-thick fluorine resin layer constituted of a perfluoroalkyl-acrylic copolymer. In this manner, a magneto-optical disk 1 was prepared. At this time, a solution of the fluorine resin was diluted with a solvent (a mixture of Fron R-112 with an alcohol) so that the solid content was 10%. Also, spin coating was carried out for 10 seconds at 300 rpm and then for 10 seconds at 3,000 rpm.

COMPARATIVE EXAMPLE 1

A silicone resin layer having a thickness of approximately 2 $\mu$m was provided on the outer surface of the same type of substrate as the one used in the magneto-optical disk 1 by a spin coating process using Tosguard (#520 supplied by Toshiba Silicone K. K.) and a primer (#PH-91 supplied by Toshiba Silicone K. K.). Thereafter, in order to form siloxane bonds (by condensation with dehydration), the substrate provided with the silicone resin layer was heated for one hour at 120° C. A first dielectric layer, a magneto-optical recording layer and a second dielectric layer which were of the same type as in the case of magneto-optical disk 1 were overlaid on the substrate. In this manner, a magneto-optical disk 2 was prepared.

COMPARATIVE EXAMPLE 2

A polyvinylidene chloride layer having a thickness of 2 $\mu$m was provided on the outer surface of the same type of substrate as the one used in the magneto-optical disk 1 by a spin coating process using a solution of the solvent-soluble type of polyvinylidene chloride (#F-216 supplied by Asahi Chemical Industry Co., Ltd.) in a solvent mixture of tetrahydrofuran (THF) with toluene. In this manner, a magneto-optical disk 3 was prepared.

COMPARATIVE EXAMPLE 3

A polyvinylidene chloride layer having a thickness of 2 $\mu$m was provided on the outer surface of the same type of substrate as the one used in the magneto-optical disk 1 by a spin coating process using an aqueous dispersion of the aqueous dispersion type of polyvinylidene chloride (#6-520 supplied by Asahi Chemical Industry Co., Ltd.). In this manner, a magneto-optical disk 4 was prepared.

COMPARATIVE EXAMPLE 4

A poly-para-xylylene resin layer having a thickness of 2 $\mu$m was provided on the outer surface of the same type of substrate as the one used in the magneto-optical disk 1 by a process of decomposing and sublimating a dimer of poly-para-xylylene. In this manner, a magneto-optical disk 5 was prepared.

COMPARATIVE EXAMPLE 5

An ultraviolet-curing resin layer having a thickness of 2 $\mu$m was provided on the outer surface of the same type of substrate as the one used in the magneto-optical disk 1 by a spin coating process using an ultraviolet-curing resin (#SD-17 supplied by Dainippon Ink and Chemicals, Inc.). In this manner, a magneto-optical disk 6 was prepared.

For comparison of the manufacturing productivities of the magneto-optical disks 1 to 6 prepared in the manner described above, Table 1 shows the pre-treatment time, spin coating time, post-treatment time, total treatment time and problems encountered when providing the respective moisture barrier layers.

The results of the measurements are also shown in Table 2.

TABLE 2

| | Measuring item | |
|---|---|---|
| | Axial deflection and C/N ratio before and after the cycle test | |
| Change in appearance after temp.- | axial deflection [μm] | C/N ratio [dB] |

TABLE 1

| Disk | Pre-treatment time | Application time of main composition | Post-treatment time | Total treatment time | Problem |
|---|---|---|---|---|---|
| Disk 1 (Ex. 1) | 0 | Application (less than 1 min.) | 0 | Approx. 1 min./disk | None |
| Disk 2 (Comp. Ex. 1) | Primer application (1 min.) Temp./humidity adjustment 23–28° C. 30–55% (30 min.) (31 min. total) | Application (1 min.) Temp./humidity adjustment 23–28° C. 20–70% (20 min.) (21 min. total) | Heating (120° C.) (60 min.) | Approx. 112 min./disk | The disk is bent by heating. |
| Disk 3 (Comp. Ex. 2) | 0 | Application (less than 1 min.) | 0 | Approx. 1 min./disk | The substrate surface is dissolved and whitened. |
| Disk 4 (Comp. Ex. 3) | Substrate heating to 30° C. and composition heating to 50–70° C. (60 min. total) | Application (less than 1 min.) | Dying (50–70° C.) (more than 10 min.) | Approx. 71 min./disk | The coating layer is readily whitened, and cracking readily arises inside the coating layer. |
| Disk 5 (Comp. Ex. 4) | Evacuation (30 min.) | Layer forming (2 hr.) | vacuum chamber leak (10 min.) | Approx. 160 min./disk | The production equipment occupies a large space because of the vacuum processing apparatus. |
| Disk 6 (Comp. Ex. 5) | 0 | Application (less than 1 min.) | Irradiation (Approx. 2 min.) | Approx. 3 min./disk | An ultraviolet ray irradiating apparatus is necessary. |

As is clear from Table 1, in the preparation of the magneto-optical disk 1 of Example 1, pre-treatment and post-treatment are not required, and the application time for the main composition is very short. Therefore, with the magneto-optical disk 1 of Example 1, the manufacturing productivity can be improved markedly as compared with the magneto-optical disks of Comparative Examples 1, 3, 4 and 5. The treatment time for the magneto-optical disk 3 of Comparative Example 2 is as short as the treatment time for the magneto-optical disk 1 of Example 1. However, the surface of the substrate in the magneto-optical disk 3 is corroded and whitened by the main composition, and therefore the light transmittence deteriorates. Therefore, the magneto-optical disk 3 is not suitable for practical use.

Then, for the magneto-optical disk 1 of Example 1 and a magneto-optical disk 7 of Example 2, five cycles of a temperature-humidity cycle test were carried out (in accordance with JIS C5024, Method I), and the presence or absence of corrosion and cracks in the magneto-optical recording layer, C/N ratios and axial deflection before and after the test were measured. Table 2 shows the results of the measurement. The magneto-optical disk 7 was prepared by providing a moisture barrier layer of the same type as the one in the magneto-optical disk 1 on the edge faces of the magneto-optical recording layer and other layers as well as on the outer surface of the substrate. Specifically, the magneto-optical disk 7 had a configuration corresponding to that shown in FIG. 2, whereas the magneto-optical disk 1 had the configuration shown in FIG. 1. Also, a magneto-optical disk 8 wherein the moisture barrier layer of the magneto-optical disk 1 was omitted was prepared, and the same measurements as for the magneto-optical disk 1 were carried out on the magneto-optical disk 8.

| Disk | humidity cycle test (JIS C5024, Method I) | before test | after test | before test | after test |
|---|---|---|---|---|---|
| Disk 1 (Ex. 1) | Slight corrosion on outer circumference of recording layer | 65 | 69 | 49 | 47 |
| Disk 7 (Ex. 2) | No corrosion, no crack | 82 | 90 | 51 | 50 |
| Disk 8 | Corrosion and cracks on outer circumference of recording layer | 73 | 78 | 48 | 45 |

As is clear from Table 2, the magneto-optical disk 1, wherein a moisture barrier layer constituted of fluorine resin is provided on the outer surface of the substrate, is free from corrosion and cracking of the magneto-optical recording layer after being subjected to a severe temperature-humidity cycle test. Thus the magneto-optical disk 1 exhibits a markedly improved weatherability over the weatherability of the magneto-optical disk 8 having no moisture barrier layer. The magneto-optical disk 7 wherein the moisture barrier layer constituted of fluorine resin is provided also on the edge faces of the substrate, the magneto-optical recording layer and other layers is even better than the magneto-optical disk 1 in that corrosion can be prevented completely. Changes in the axial deflection and the C/N ratio before and after the cycle test did not differ greatly among the magneto-optical disks 1, 7 and 8, and no adverse effect was generated by the provision of the moisture barrier layer.

We claim:

1. A magneto-optical disk comprising a substrate and at least a magneto-optical recording layer provided on said substrate, wherein the improvement comprises the provision of a moisture barrier layer comprising an alkyl fluoride-acrylic copolymer on the surface of said substrate on the side opposite to the substrate surface on which said magneto-optical recording layer is provided.

2. A magneto-optical disk as defined in claim 1 wherein said moisture barrier layer is provided also on all the edge faces of said substrate and said magneto-optical recording layer.

* * * * *